United States Patent [19]

Mannherz et al.

[11] Patent Number: 4,766,770
[45] Date of Patent: Aug. 30, 1988

[54] LOW DUTY CYCLE ELECTROMAGNETIC FLOWMETER

[75] Inventors: Elmer D. Mannherz, Southampton; Roy F. Schmoock, Yardley, both of Pa.

[73] Assignee: Fischer & Porter Company, Warminster, Pa.

[21] Appl. No.: 595,386

[22] Filed: Mar. 30, 1984

[51] Int. Cl.$^4$ .............................................. G01F 1/60
[52] U.S. Cl. .................................................. 73/861.17
[58] Field of Search ............ 73/861.17, 861.16, 861.12

[56] References Cited

U.S. PATENT DOCUMENTS 4,308,753  1/1982  Olson ................................ 73/861.17

FOREIGN PATENT DOCUMENTS

| 3202494 | 4/1983 | Fed. Rep. of Germany ... | 73/861.17 |
| 0115164 | 7/1979 | Japan ................................. | 73/861.17 |
| 0119955 | 9/1979 | Japan ................................. | 73/861.17 |
| 0033685 | 3/1980 | Japan ................................. | 73/861.17 |
| 0076912 | 6/1980 | Japan ................................. | 73/861.17 |
| 0076913 | 6/1980 | Japan ................................. | 73/861.17 |
| 0005615 | 1/1983 | Japan ................................. | 73/861.17 |

Primary Examiner—Charles A. Ruehl
Attorney, Agent, or Firm—Michael Ebert

[57] ABSTRACT

An electromagnetic flowmeter in which the fluid being metered is conducted through a flow tube having a pair of electrodes, the fluid intersecting a magnetic field whereby the resultant voltage induced in the fluid is transferred to the electrodes to provide a signal indicative of flow rate. The magnetic field is created by a pair of electromagnets at diametrically-opposed positions on the flow tube to produce lines of magnetic flux thereacross. These electromagnets are driven by a low-frequency pulsatory wave, each periodic cycle of which is constituted by an excitation pulse of brief duration and high amplitude followed by a relaxation interval of relatively long duration so that the resultant duty cycle is low. Because the average power consumed by the electromagnets is at a very low level, this makes it possible to power the flowmeter from a remote station through a two-wire transmission line which also conveys the signal to the station. And because current flow through the electromagnets is heavy during the pulse intervals, the resultant peak magnetic flux is high, thereby enhancing the signal-to-noise ratio of the flowmeter.

3 Claims, 3 Drawing Sheets

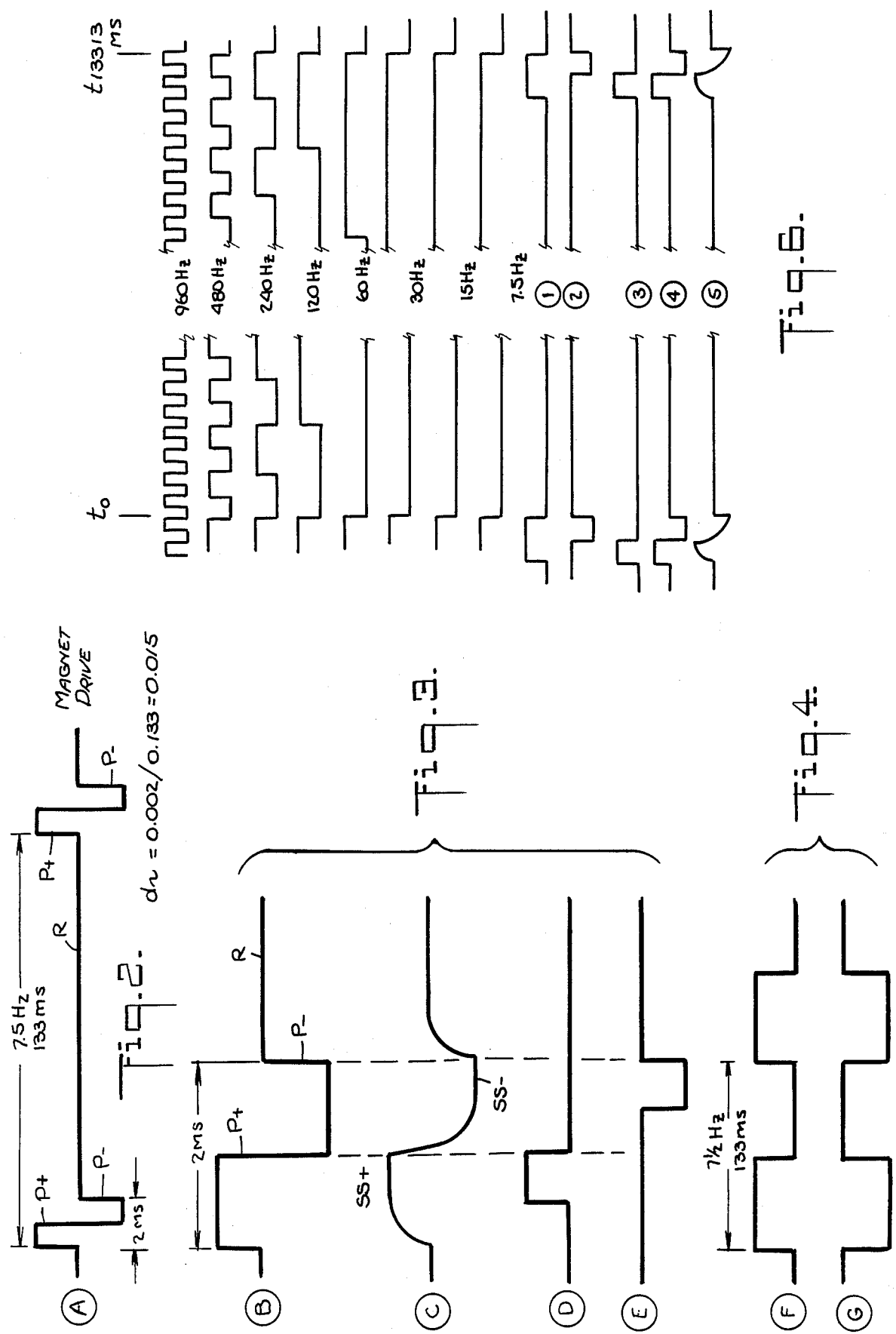

LOW DUTY CYCLE ELECTROMAGNETIC FLOWMETER

BACKGROUND OF INVENTION

Field of Invention

This invention relates generally to electromagnetic flowmeters, and more particularly to a flowmeter which operates at a relatively low average power level, yet has an exceptionally high signal-to-noise ratio.

In an electromagnetic flowmeter, the fluid whose flow rate is to be measured is conducted through a flow tube provided with a pair of diametrically-opposed electrodes, a magnetic field perpendicular to the longitudinal axis of the tube being established by an electromagnet. When the flowing liquid intersects the field, a voltage is induced therein which is transferred to the electrodes. The voltage, which is proportional to the average velocity of the liquid and hence to its average volumetric rate, is then amplified and processed to actuate a recorder to indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications.

The adverse effects encountered in A-C operation of electromagnetic flowmeters can be attributed to the rate of change of the flux field $(d\phi)/dt$, serving to induce unwanted signals in the pick-up loop constituted by the electrodes and the liquid bridging the electrodes. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\phi/dt=0$ is satisfied. But, as previously noted, d-c operation to create a steady state field is not acceptable, for galvanic potentials are produced and polarization is encountered.

In U.S. Pat. No. 4,296,636 to Mannherz and in U.S. Pat. No. 3,783,687 to Mannherz et al., whose entire disclosures are incorporated herein by reference, there are disclosed electromagnetic flowmeters in which the excitation current for the electromagnetic coil is a low-frequency wave serving to produce a periodically-reversed steady state flux field, whereby unwanted in-phase and quadrature components are minimized without giving rise to polarization and galvanic effects. This low frequency wave may be derived by means of a presettable scaler coupled to the standard a-c power line (60 Hz) and is at a frequency in the order of $1\frac{7}{8}$, $3\frac{3}{4}$, $7\frac{1}{2}$ or 15 Hz.

A flowmeter arrangement which in many respects is similar to that disclosed in the Mannherz et al. patent is described in the Schmoock U.S. Pat. No. 4,370,892, whose entire disclosure is incorporated herein by reference.

A major drawback of the conventional drive system for an electromagnetic flowmeter is that its power requirements are substantial. This precludes the use of battery operation. Also, as will later be explained, the signal-to-noise ratio of a conventional flowmeter is such that when the prevailing noise level is high, it is difficult to detect the signal that reflects flow rate.

When the fluid being metered takes the form of a coarse slurry containing solid particles such as sand, fly ash or salt which impinge on the surface of the electrodes as the slurry passes through the meter tube, it has been found that a substantial noise component is generated with a conventional flowmeter. This makes signal detection more difficult and in some instances impossible. The meter electrodes in combination with the fluid acting as an electrolyte define a galvanic cell, and when the solids in the slurry strike the electrodes and alter their interface to the fluid, this action brings about a rapid change in galvanic voltage, thereby generating noise. A second source of noise arises when the flowmeter is run partially full. In the case of electrodes which make direct contact with the fluid, the resultant sloshing of the fluid on the surface of the electrodes produces excessive galvanic noise.

Noise is any voltage that does not convey measurement information. Under the most favorable circumstances where noise has been minimized by filtering or other expedients, there are still certain sources of noise present resulting from the granular nature of matter and energy. While noise fluctuations may be small compared with the total energy transfer involved in most measurements, the existence of a noise background limits the ultimate sensitivity to which a measurement can be carried.

SUMMARY OF INVENTION

In view of the foregoing, the main object of this invention is to provide an electromagnetic flowmeter whose electromagnets are driven by a pulsatory wave having a low duty cycle.

More particularly, an object of this invention is to provide a pulsatory wave for driving the electromagnets, each periodic cycle of which is constituted by a high amplitude excitation pulse followed by a relatively long relaxation interval whereby the current flow through the electromagnets is heavy during the pulse periods and the resultant peak magnetic flux produced by electromagnets is high, thereby enhancing the signal-to-noise ratio of the flowmeter.

A significant advantage of the invention is that the average power consumed by the electromagnet is at a very low level, thereby making it possible to energize the electromagnets with a battery. This also makes feasible two-wire line transmission in which the flowmeter signal is conveyed over the line which also functions to deliver power to the flowmeter.

Also an object of this invention is to provide a flowmeter which operates efficiently and reliably.

Briefly stated, these objects are attained in an electromagnetic flowmeter in which the fluid being metered is conducted through a flow tube having a pair of electrodes, the fluid intersecting a magnetic field whereby the resultant voltage induced in the fluid is transferred to the electrodes to provide a signal indicative of flow rate. The magnetic field is created by a pair of electromagnets at diametrically-opposed positions on the flow tube to produce lines of magnetic flux thereacross. These electromagnets are driven by a low-frequency pulsatory wave, each periodic cycle of which is constituted by an excitation pulse of brief duration and high amplitude followed by a relaxation interval of relatively long duration so that the resultant duty cycle is low. Because the average power consumed by the electromagnets is at a very low level, this makes it possible to power the flowmeter from a remote station through a two-wire transmission line which also conveys the signal to the station. And because current flow through the electromagnets is heavy during the pulse intervals, the resultant peak magnetic flux is high, thereby enhancing the signal-to-noise ratio of the flowmeter.

OUTLINE OF DRAWINGS

For a better understanding of the invention as well as other objects and further features thereof, reference is made to the following detailed description to be read in conjunction with the accompanying drawings, wherein:

FIG. 2 illustrates the wave form of the magnet drive;

FIGS. 3 and 4 are timing diagrams of the flowmeter;

FIG. 6 is a timing diagram of the gating logic.

DESCRIPTION OF INVENTION

Figure 1:
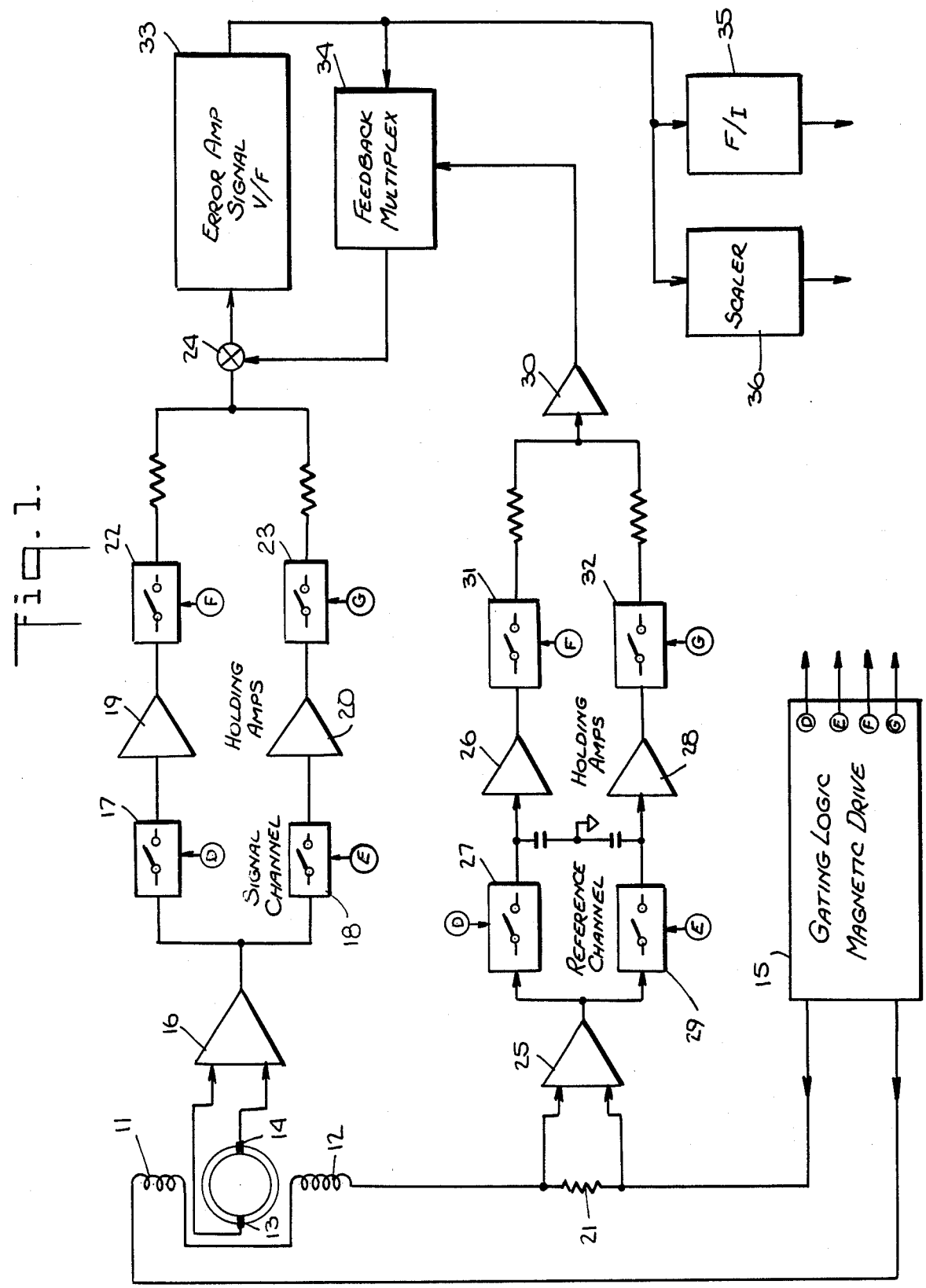
FIG. 1 is a block diagram of a magnetic flowmeter in accordance with the invention.

The Flowmeter Primary and Secondary:

Referring now to the drawing, there is shown a flowmeter system in accordance with the invention, constituted by a primary in the form of an electromagnetic flowmeter adapted to produce a low-frequency signal output whose amplitude is proportional to the flow rate of the liquid being measured, and a secondary which converts this low level a-c signal to a proportional d-c current output signal.

In addition to the analog d-c current output, the secondary also yields a pulse output whose frequency is proportional to flow rate, the pulse output being useful in operating digital registers, counters or batch control systems. By means of proper scale factoring, registry of total accumulated flow may be integrated from this rate signal.

The flowmeter primary includes a flow tube through which the liquid to be measured is conducted. A pair of electromagnets each having a coil (11 and 12) is provided at diametrically-opposed positions on tube to establish a magnetic field transverse to the direction of flow, which is parallel to the longitudinal axis of the tube. Electrodes 13 and 14 in contact with the flowing fluid are disposed at diametrically-opposed points on the flow tube on an axis which is perpendicular both to the longitudinal direction of flow and the transverse magnetic field.

As is well known, a voltage is induced in the liquid whose flow intersects the magnetic field, this voltage being transferred to the electrodes to produce a signal at flowmeter output terminals that reflects the low rate. This signal is referred to as the flow-induced signal to distinguish it from spurious signal components that are independent of flow rate and noise.

Coils 11 and 12 of the electromagnets are connected in series and are excited by a relatively low-frequency pulsatory wave applied thereto by a magnetic drive gating logic represented by block 15.

This pulsatory wave, represented in FIG. 2 by wave A, has a low frequency which, by way of example, is 7.5 Hz. Each periodic cycle of the wave is constituted by a high amplitude alternating pulse interval formed by positive and negative pulse components P+ and P− whose total duration is brief (i.e., 2 milliseconds), which pulse interval is followed by a relatively prolonged relaxation interval (i.e., 131 milliseconds). The total cycle time of the 7.5 Hz wave is 133 milliseconds.

Because the excitation pulse produced in each periodic cycle of the pulsatory wave is very brief and is followed by a relatively long relaxation interval, in a flowmeter in accordance with the invention, it is necessary, in order to provide a continuous rather than an intermittent output, to include holding amplifiers which accept the signal produced during the excitation pulse interval and hold this signal until the holding amplifier is updated by the succeeding signal.

Thus, in the arrangement shown in FIG. 1, the flow-induced signal yielded by electrodes 13 and 14 of the flowmeter primary are fed to a pre-amplifier 16 whose output is fed through electronic switches 17 and 18 to holding amplifiers 19 and 20, respectively. These switches are alternately actuated so that fed into holding amplifier 19 is the signal resulting from the positive pulse component P+, and into holding amplifier 20, the signal resulting from the negative pulse component P−, but only during the steady state conditions of these signals.

The manner in which this result is attained will be explained in conjunction with FIG. 3, in which wave B is an enlarged showing of the pulse interval illustrated in FIG. 2. It will be seen that pulse components P+ and P− appear during a 2 millisecond interval, each pulse component lasting one millisecond.

Wave C in FIG. 3 represents the magnetic current flowing through coils 11 and 12 during the pulse interval as well as the resultant flow signal yielded by electrodes 13 and 14 which takes the same form. It also represents the current flowing through a reference resistor 21 in series with coils 11 and 12 to produce a reference voltage proportional to the magnetic current.

It is important to note that wave C representing the signal from the electrodes, rises during the early portion of positive pulse component P+ until it attains a steady state condition SS+ which it maintains for the rest of this pulse. Likewise, during negative pulse component P−, we find in wave C a steady state condition SS−. In order to avoid transients, electric switches 17 and 18 are turned on to supply holding amplifiers 19 and 20 with the signals only during their steady state condition.

Gating logic 15, which is controlled by clock pulses, yields square wave switching pulses D and E represented by waveforms D and E in FIG. 3. Square wave pulse D goes to switch 17 and square wave pulse E to switch 18. It will be seen that the duration of switching pulse D corresponds to the steady state intervals S+ of the signal and that the duration of switching pulse E corresponds to the steady state interval SS− of the signal.

Hence, what is applied to holding amplifier 19 by switch 17 is the positive steady-state interval of the flowmeter signal, and what is applied to holding amplifier 20 by a switch 18 is the negative steady state interval of the signal. These inputs are held by the holding amplifiers until the next inputs which serve to update the signals.

The output of holding amplifier 19 is fed into a summing junction 24 through an electronic switch 22, and the output of holding amplifier 20 is fed into this junction through an electronic switch 23. These switches are alternately actuated by means of square wave switching pulses F and G derived from gating logic 15. Switching pulse F is operative during the first half of each full 133 millisecond period of the 7.5 Hz pulsatory wave, as shown in FIG. 4; while switching pulse G is operative during the second half of this period. Thus, first the held positive steady-state signal from holding amplifier 19 is applied to summing junction 4, and then the held negative steady-state signal from holding amplifier 20.

The reference voltage developed across resistor 21 is proportional to the magnetic flux established in the flow tube and follows variations therein as a result of changes in drive current, temperature effects, etc. In the secondary of the flowmeter, the ratio of the input signal to the reference voltage is measured. To effect such ratio measurement, the reference voltage is applied through an input amplifier 25 to a holding amplifier 26 by way of an electronic switch 27, and to a holding amplifier 28 by way of an electronic switch 29. Switches 27 and 29 are activated from the gating logic in the same manner as electronic switches 17 and 18 in the signal channel by square wave switching pulses D and E, respectively.

The outputs of holding amplifiers 26 and 28 in the reference channel are applied to a reference voltage output amplifier 30 through respective electronic switches 31 and 32 which are activated by square wave switching pulses F and G in the same manner as switches 22 and 23 in the signal channel.

Ratio measurement is achieved in the secondary by means of a feedback multiplier 34 in a feedback loop extending between the output of an error amplifier 33 and another input of summing junction 24 whose output goes to the input of error amplifier 33. Applied to the feedback multiplier is the output of reference amplifier 30. In the summing junction, the input signal and the output of the feedback multiplier are compared, any difference therein being amplified in error amplifier 33. The output of error amplifier 33 is applied to a frequency-to-current converter 35 to provide a current in a useful range, such as 4 to 20 mADC. It is also applied to a scaler 36. It is to be understood that while excitation is effected by periodic alternating pulses, it may also be effected by periodic unidirectional pulses; but in all cases, the intermittent signals resulting from pulse excitation in their steady state condition must be held.

Duty Cycle:

By using in the example given above a 2 ms magnet excitation during each pulse interval in a total period of 133 ms, this yields a low duty cycle of 0.015. Thus, if this drive system were used with an existing miniature electromagnetic flowmeter marketed by Fischer & Porter Company of Warminster, Pa., under the Mini-Mag trademark and having a one-inch diameter flow tube, the normal average power requirement to excite the electromagnets of this meter, which is about 2.5 watts, would be reduced to about 30 milliwatts. A two-inch diameter version of the Mini-Mag meter which presently requires 6.25 watts to operate, would, with a drive system in accordance with the invention, be reduced to an average power level of 94 milliwatts.

Because of the extremely low operating power levels made possible by the use of a pulsatory excitation wave in accordance with the invention, it becomes feasible to operate the meter from a battery, or by supplying power thereto through a two-wire transmission line in which the signal from the meter which is installed in the field is conveyed over the same line to a remote receiving station having a battery source to supply the power to the meter in the field.

Another important aspect of the invention is that the pulsatory excitation wave substantially increases the peak flux produced by the electromagnets, thereby attaining an enhanced signal-to-noise ratio.

For example, an existing one-inch Mini-Mag meter, as identified previously, presently runs at 10 volts and 0.25 amperes (i.e., 2.5 watts). With an average power of 2.5 watts and with a duty cycle of 0.015, the peak power becomes 166.67 watts. And with watts equal to $I^2R$, then:

$$I = \sqrt{\frac{166.67 \text{ watts}}{40 \text{ ohms}}} = 2.04 \text{ amperes.}$$

Inasmuch as the magnetic flux produced by the electromagnets is directly proportional to ampere turns, the flux level will increase by the ratio of the currents; that is, the ratio between 2.04 amperes when operating in accordance with the invention, and 0.25 amperes for the existing operation of the one-inch Mini-Mag meter. This yields a flux density increase of 8.156 times that of the existing Mini-Mag meter and hence a greatly enhanced signal-to-noise ratio.

Figure 5:
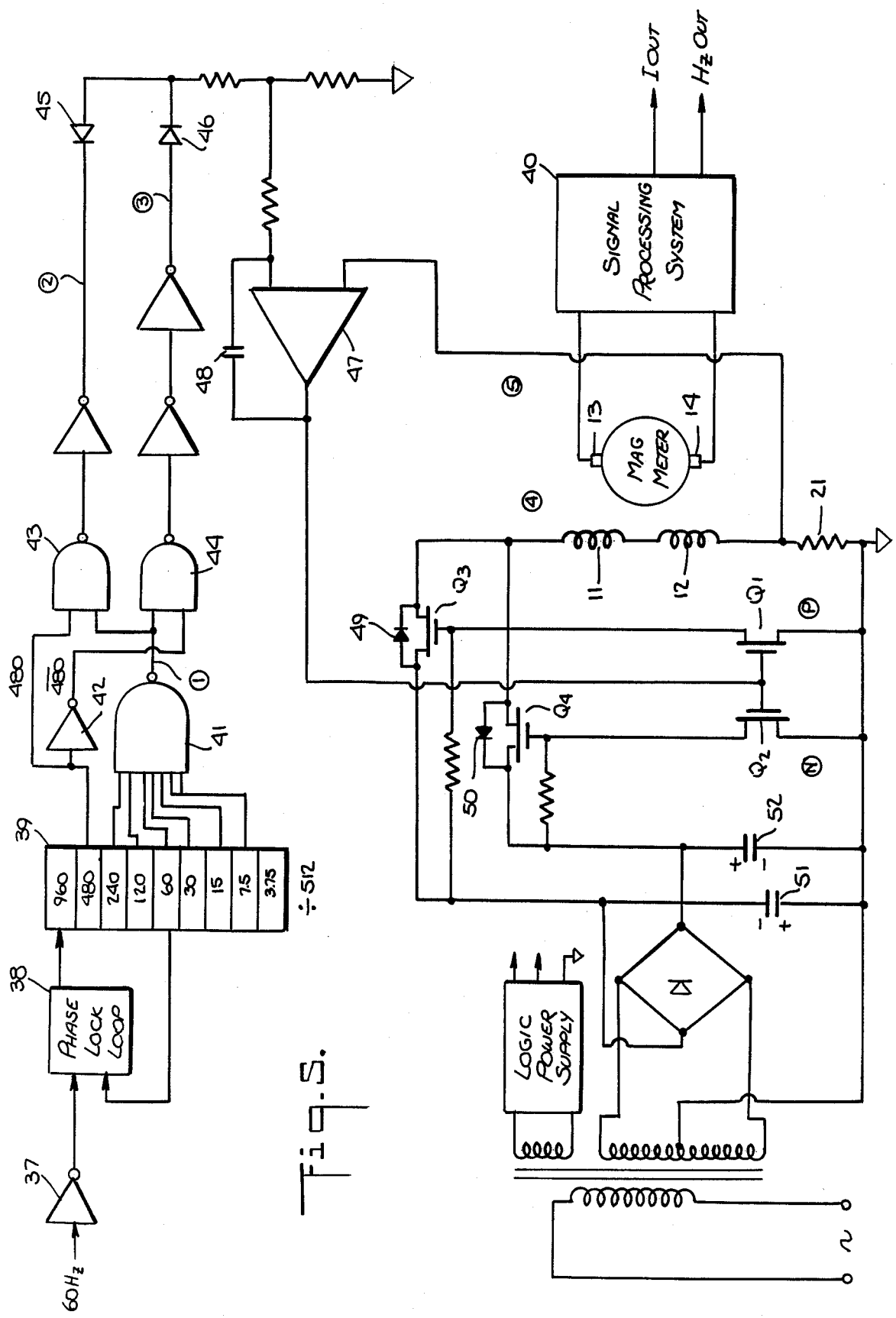
FIG. 5 is a block diagram of the gating logic for the magnetic drive included in the flowmeter.

Gating Logic:

In FIG. 1, gating logic 15 represented in block form, generates the required excitation voltage wave for the electromagnet of the primary and the switching pulses for the secondary of the flowmeter. Gating logic 15 is shown in greater detail in FIG. 5 where it will be seen that applied to an inverter 37 is a clock frequency (i.e, 60 Hz) which is shaped and delivered to a phase-lock loop 38 operating in conjunction with a binary divider 39 to multiply the 60 Hz clock frequency upward to 1920 Hz.

Yielded by this arrangement is a chain of frequencies that range down from 1920 Hz to 480; 240; 120; 60; 30; 15; and 7.5 Hz. This chain of frequencies is used in the logic to set up the drive waveform ④ (see the timing diagram in FIG. 6) that has a total plus-minus duration of 2.0833 ms. This is applied as the excitation voltage to the electromagnetic coils 11 and 12 of the flowmeter primary. The signal from electrodes 13 and 14 is applied to the signal processing system 40, generally representing the secondary of the meter.

Drive waveform ④ repeats itself at a 7.5 Hz rate or every 133.33 ms. In practice, the drive rate may be selected to have a higher or lower frequency than 7.5 Hz, and the duration of the plus-minus alternating pulse interval can be adjusted to have a longer or shorter time, so that one may choose whatever low duty cycle is desired.

The 240; 120; 60; 30; 15 and 7.5 Hz frequencies from binary divider 39 are combined in a NAND gate 41 to provide a 2.0833 ms window represented by waveform ① every 133.33 ms.

The 480 Hz frequency from divider 39 is applied to an inverter 42 to yield a $\overline{480}$ Hz. frequency. The 480 and $\overline{480}$ Hz waves are combined with waveform ① from NAND gate 41 in NAND gates 43 and 44 to provide waveforms ② and ③, respectively. Waveforms ② and ③ are then combined through amplifier channels including diodes 45 and 46 to provide a set point which is applied to the non-inverting plus (+) input of an amplifier 47 acting as a comparator.

Comparator 47 has a positive feedback capacitor 48 connected between its output and its positive input to act as a switcher-type drive system. Its output is applied to transistors $Q_1$ and $Q_2$ which are P and N channel power Vmos devices, respectively. The outputs of transistors $Q_1$ and $Q_2$ are applied to transistors $Q_3$ and $Q_4$, respectively, which act as the final N and P channel power drivers for electromagnetic coils 11 and 12 and apply waveform ④ thereto.

Since transistors $Q_1$–$Q_2$ and $Q_3$–$Q_4$ are complementary pairs, only two can be on at any time. After the output of comparator 47 is terminated and drops to zero, all four transistors will remain in the "off" state.

Reference resistor 21, which is in series with the electromagnetic coils, therefore monitors the current flow therethrough which is proportional to the magnetic flux in the flowmeter. The reference voltage developed across resistor 21 is applied to the negative (−) input of the comparator. This provides negative feedback in the comparator and thereby controls the current level through the coils to give rise to a steady-state flux within the flowmeter proper.

It is to be noted that positive feedback capacitor 48 in the comparator could be removed, thereby converting this amplifier into a linear amplifier, in which case current to the electromagnets would be under linear control; that is, nonswitching. The obvious disadvantage of this would be higher power consumption by the drive system. Its advantage, however, would be the absence of ripple.

Diodes 49 and 50 connected across transistors $Q_3$ and $Q_4$, respectively, function as flyback suppression and energy conservation devices. After the positive drive to the coil terminates and before the negative drive is turned on, the energy stored in the electromagnets will result in a very high voltage spike having negative polarity. This negative spike will pass through conductive diode 49 and charge capacitor 51 for the next event. After the negative drive terminates, a high voltage spike will be produced as a result of energy stored in the electromagnets, and this will pass through conductive diode 50 to charge a capacitor 52 for the next event.

This arrangement, therefore, keeps the flyback voltage close to the level provided by the full-wave power supply which includes bridge rectifier 53, and it also returns some of the energy back to the drive system.

The total "on" time for this arrangement is 2.0833 ms for a total period of 133.33 ms. Hence the duty cycle is equal to 2.0833 divided by 133.33, which equals 0.015625.

While there has been shown and described a preferred embodiment of a low duty cycle electromagnetic flowmeter in accordance with the invention, it will be appreciated that many changes and modifications may be made therein without, however, departing from the essential spirit thereof.

We claim:
1. An electromagnetic flowmeter comprising:
   A. a flow tube through which the fluid to be metered is conducted, said flow tube having a pair of electrodes;
   B. an electromagnet to produce a magnetic field whose lines of flux are substantially normal to the flow axis of the tube, whereby these lines are intersected by the fluid to induce a voltage in the fluid which is transferred to the electrodes to provide a signal indicative of flow rate;
   C. a drive system for applying a low frequency pulsatory wave whose frequency is no higher than 30 Hz to said electromagnet, each periodic cycle of which is constituted by an excitation pulse having an excitation interval of brief duration which is less than 10 milliseconds followed by a relaxation interval of relatively long duration which is at least ten times longer than the excitation interval so that the resultant duty cycle is low and the average power consumed by the electromagnet is at a very low level, said pulse being of high amplitude to provide an exceptionally high flux density during the excitation interval, thereby enhancing the signal-to-noise ratio of the flowmeter;
   D. means to apply the signal yielded by the electrodes during the excitation interval to a holding amplifier which maintains the signal during the relaxation interval which follows and updates it when the next signal is applied thereto, and
   E. electronic switching means interposed between the electrodes and the holding amplifier to apply said signal to said holding amplifier only during its steady state condition.

2. A flowmeter as set forth in claim 1, wherein the pulse during the excitation interval is alternating and has positive and a negative component.

3. A flowmeter as set forth in claim 1, further including means to derive a reference voltage that is proportional to the current flowing in the electromagnet during the excitation interval, and means to measure the ratio of the reference voltage to the signal yielded by the holding amplifier, and a second holding amplifier to which said reference voltage is applied, said second holding amplifier being activated in synchronism with said switching means.

* * * * *